United States Patent
Rajamani et al.

(10) Patent No.: US 7,120,776 B2
(45) Date of Patent: Oct. 10, 2006

(54) METHOD AND APPARATUS FOR EFFICIENT RUNTIME MEMORY ACCESS IN A DATABASE

(75) Inventors: Kumar Rajamani, Santa Clara, CA (US); Namit Jain, Folsom, CA (US)

(73) Assignee: Oracle International Corporation, Redwood Shores, CA (US)

( * ) Notice: Subject to any disclaimer, the term of this patent is extended or adjusted under 35 U.S.C. 154(b) by 320 days.

(21) Appl. No.: 10/771,573

(22) Filed: Feb. 3, 2004

(65) Prior Publication Data

US 2005/0192935 A1 Sep. 1, 2005

(51) Int. Cl.
*G06F 12/00* (2006.01)

(52) U.S. Cl. ...................... 711/170; 711/171

(58) Field of Classification Search ............... 711/166, 711/170, 171; 717/139
See application file for complete search history.

(56) References Cited

U.S. PATENT DOCUMENTS

| | | | | |
|---|---|---|---|---|
| 4,907,151 A | * | 3/1990 | Bartlett ...................... | 711/166 |
| 4,989,132 A | * | 1/1991 | Mellender et al. .......... | 717/139 |

* cited by examiner

*Primary Examiner*—Pierre Bataille
*Assistant Examiner*—Paul Schlie
(74) *Attorney, Agent, or Firm*—Kirk D. Wong; Hickman Palermo Truong & Becker LLP

(57) ABSTRACT

A method and apparatus for efficient runtime memory access in a database is provided. A buffer pool is pre-allocated in cache. Buffers in the buffer pool are sized to accommodate average case queries and frequently executed queries. Buffers from the buffer pool are allocated to query working sets during runtime to reduce cache misses.

36 Claims, 10 Drawing Sheets

METHOD AND APPARATUS FOR EFFICIENT RUNTIME MEMORY ACCESS IN A DATABASE

FIELD OF THE INVENTION

The present invention relates to cache memory management. The invention relates more specifically to a method and apparatus for efficiently managing cache memory for database accesses during runtime.

BACKGROUND OF THE INVENTION

In general, a cache is a place for temporarily storing a thing so that the thing can be accessed more quickly and/or efficiently than is possible where the thing is normally stored. Within the context of computer systems, a cache is usually memory used for temporarily storing data so that the data can be accessed more quickly and/or efficiently than is possible in the memory in which the data normally resides. Thus, volatile memory is typically used to cache data that resides on non-volatile memory, such as magnetic disks. Similarly, fast volatile memory is typically used to cache data that resides in slower volatile memory. It is common for computer systems to use multiple levels of cache, where each level of cache is typically smaller and faster than the preceding level.

Caches may be implemented within a processor itself. The processor could then access the cache memory much faster than off-processor cache memory because the address and data bus used to access the cache memory was implemented on the processor die itself. The internal cache memory was called the level one (L1) cache. An L1 cache is a relatively small amount of static RAM (SRAM) memory used as a cache that is integrated or packaged within the same module as the processor. It is clocked at the same speed of the processor. L1 cache is used to temporarily store instructions and data, making sure the processor has a steady supply of data to process while the RAM catches up delivering new data. Data stored in the L1 cache can be used by the processor at no cost in clock cycles.

Referring to FIG. 1, most processors are currently supplied with two levels of caches. The L1 102, or primary cache, is integrated within the processor core itself 101 and is thus the fastest. The next level of cache 103, called L2 or secondary cache, is situated outside the core 101 and usually runs at a lower clock speed than the core 101, though it may also run as fast as the core 101 itself. However, even if the L2 cache 103 runs at the same clock speed as the core 101, the L2 cache 103 will be slower than the L1 cache 102 because it is not part of the core 101 itself. The size of the L2 cache 103 is always much larger than the L1 cache 102 and, if it runs fast enough, its throughput can come close to that of the L1 cache 102. Therefore, the L2 cache 103 plays a very important role in maintaining a high memory throughput to the processor.

Data pre-fetch allows the processor to "look-ahead" and fetch data from slow memory (such as a hard disk) before it is needed by the processor. This results in fewer processor pipeline stalls, and higher overall performance in many applications. The L2 cache utilizes data pre-fetch where the program data handler fetches data sequentially from the slow memory and places the data in the L2 cache. As the processor executes code from the L1 cache, if the code that it needs is not in the L1 cache (called a cache miss), the processor fetches the data from the L2 cache. The cache miss consumes some time and slows the processor's operations. The amount of time wasted is greater if the data is not in the L2 cache and the processor has to access slow memory to fetch the data. This occurs when the execution of the code is not sequential, e.g., when multi-layer function calls or long jumps occur.

Some application programs, such as database management applications, attempt to solve the cache miss problem by allocating L1 cache memory for certain operations and attempting to retain the allocated memory for the duration of the application's operation. This approach works well if there is an unlimited amount of L1 memory, which is impractical. If the L1 cache becomes fully allocated and the processor requires L1 memory space, the processor will take back some of the allocated memory. This approach also results in many cache misses after full allocation of the L1 cache, thereby slowing the application's operations.

Application programs have the ability to manipulate the data stored in the L1 cache. If an application can keep a large portion of its working data in the L1 cache throughout the execution of the application, then it can improve its overall performance. A good example of an application program that would benefit from having data remain in L1 cache is a database management system.

Referring to FIG. 2, database queries and data manipulation language (DML) commands are used to access and manipulate data in a database application. A user creates queries and DML commands 201 which are compiled 203 into an object called a cursor 202. A cursor contains a query plan 204 which describes how a query is executed. A user creates a cursor 202 to provide a prepackaged query or set of queries of the database that can be executed by other users.

FIG. 3 shows a processor 301 allocating L1 cache memory 302 to running applications via a cache memory manager 306. The cache memory manager 306 allocates L1 cache memory 302 to processes from the scratch memory space 305 (free memory space) in the L1 cache memory 302. As processes execute, the scratch memory 305 expands and contracts as the cache memory manager 306 allocates and frees memory.

As users access a database using queries, portions of L1 cache are allocated for storing the cursors constructed for those queries. Specifically, the cache memory manager 306 allocates L1 memory 302 to the "current set" 303 of cursors. The current set of cursors includes the cursors that are currently loaded into L1 memory. As the queries associated with the current set 303 are executed, they require a memory space to perform operations on the database. This memory space is called a working set 304. The cache memory manager 306 allocates the working set 304 from the L1 memory 302 for the current set 303. As a user uses the database application, cursors in the current set change. Consequently, the amount of L1 cache memory that is allocated to the database server fluctuates.

Referring to FIG. 4, a working set 401 contains a frame buffer 402 and a bind buffer 403. The frame buffer 402 and the bind buffer 403 are the two main components of the runtime memory used for the execution of a query. The frame buffer 402 is used to store the results of the query. The bind buffer 403 is used to store in-binds which are the user input variables and out-binds which are the variable values returned by the database. The database reads the in-binds from the bind buffer 403. Output variables values are stored in the bind buffer 403 by the database as out-binds.

The working sets for the entire set of queries used by an application will typically not fit into the L1 cache. This means that cache misses will frequently occur as users execute queries on the database.

Some database applications try to reduce cache misses by not freeing the L1 cache memory that a current set obtains during runtime. This approach works well in a system with an infinite amount of L1 cache memory—which is not feasible. When the L1 cache is filled and space is needed for the working set of a new query, the system writes over one of the working sets in the L1 cache. This leads to many cache misses, because L1 memory space is taken by queries that are infrequently executed and/or by queries that are stale. This results in slower response times because the system has to access the cache miss queries from slower memory.

Based on the foregoing, there is a clear need for a system that provides for the management of L1 cache memory allocation that allows an application program to run in an efficient manner by reducing cache misses. Additionally, the system would intelligently provide an application program with an adequate supply of L1 cache memory without needlessly allocating L1 cache memory because of unusual application program behavior.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for efficient runtime memory access in a database is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Allocating a Separately Managed Buffer Pool Within a Cache

Techniques are provided for minimizing cache misses by efficiently utilizing the L1 cache. Specifically, a buffer pool is allocated in the L1 cache. Memory from the buffer pool is allocated by a buffer pool manager to working sets during runtime.

Figure 8:
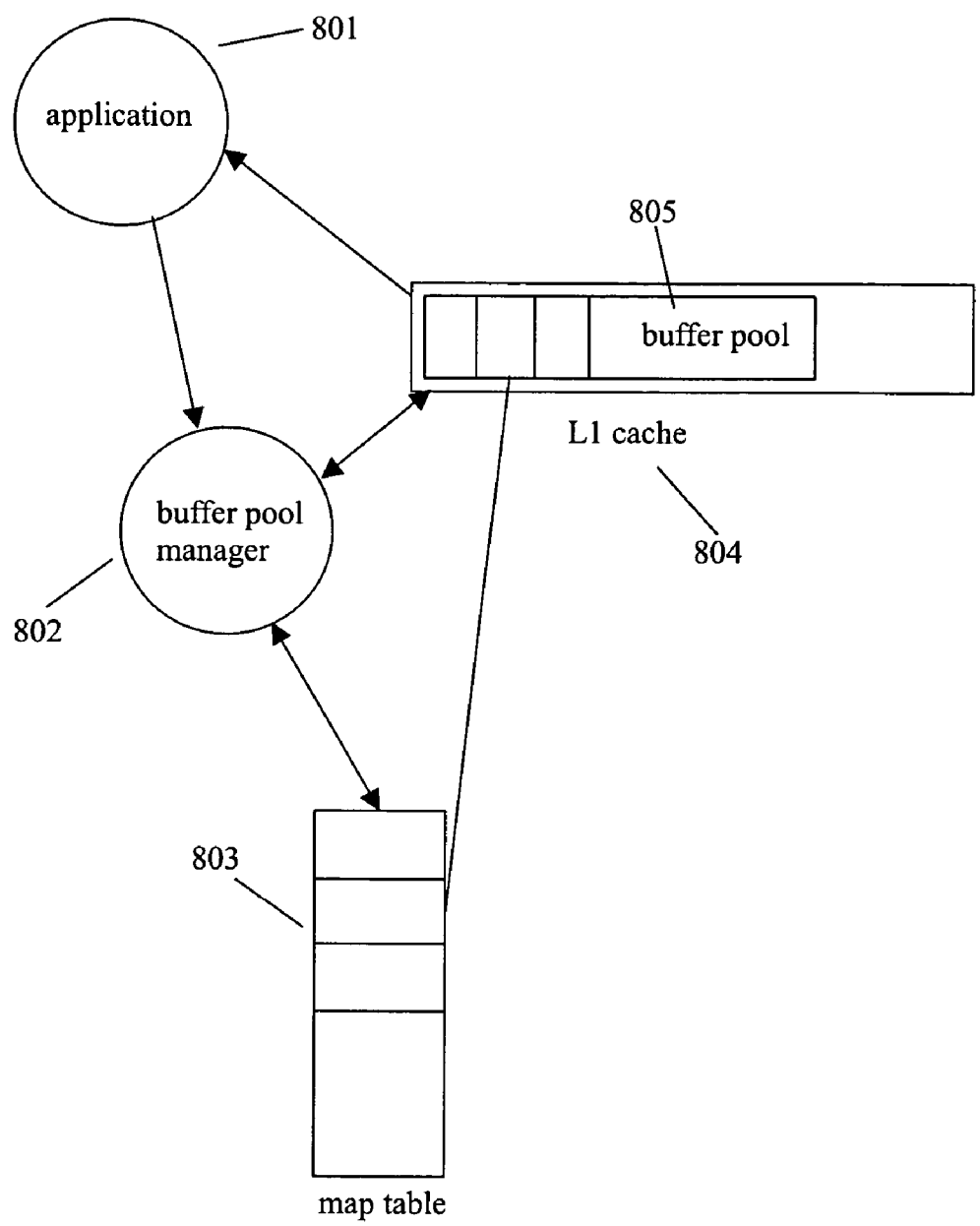
FIG. 8 is a block diagram that illustrates a buffer pool manager managing a buffer pool in L1 cache.

Refening to FIG. 8, an embodiment maintains a buffer map table 803 and a pre-allocated buffer pool 805 in the L1 cache 804. In response to executing a query, the database server spawns an application process 801 to execute the query, and requests memory from the L1 cache for the query's working set. The buffer pool manager 802 intercepts the memory request and checks the map table 803 for free memory in the L1 cache 804. A free location in the map table 803 indicates that a buffer is free in the buffer pool 805. The buffer pool manager 802 allocates a buffer from the buffer pool 805 to the application process 801 by marking the free location in the map table 803 as "in use" and pointing the application process 801 to the location in the map table 803 corresponding to the buffer in the buffer pool 805.

If an application process requests a memory size greater than the buffer size, then the buffer pool manager 802 does not perform a buffer allocation, and allows a cache miss to occur. The processor's cache manager will handle the allocation of L1 memory to the application process.

The map table 803 will indicate if there is a buffer available in the buffer pool 905 by having the first location in the map table 803 marked as free. If the first location in the map table 803 is not marked as free, then there are no available buffers in the buffer pool 805. The buffer pool manager 802 simplifies its buffer free check by only having to check the first location in the map table for free buffers. The map table 803 can be implemented as a queue, linked list, array, etc.

As the database executes a query, it performs the following sequence:
Parse query
Find the cursor
Execute
   Allocate frame & bind buffer
   Read/write memory
End of execute (free frame and bind buffers)

At the point where the process performs the end of execute operation, the query releases its allocated memory. The buffer pool manager 802 is notified by the application process 801 that the memory is being released. The buffer pool manager 802 marks the corresponding map table location as free and places the map table location in the free area in the front of the map table 803. The buffer is now available for reallocation.

Determining the Total Buffer Pool Size

According to one embodiment, the size of buffer pool required 504 is determined based on an estimate of the average buffer size, and an estimate of how many queries will be in the current set at any given time.

Figure 1:
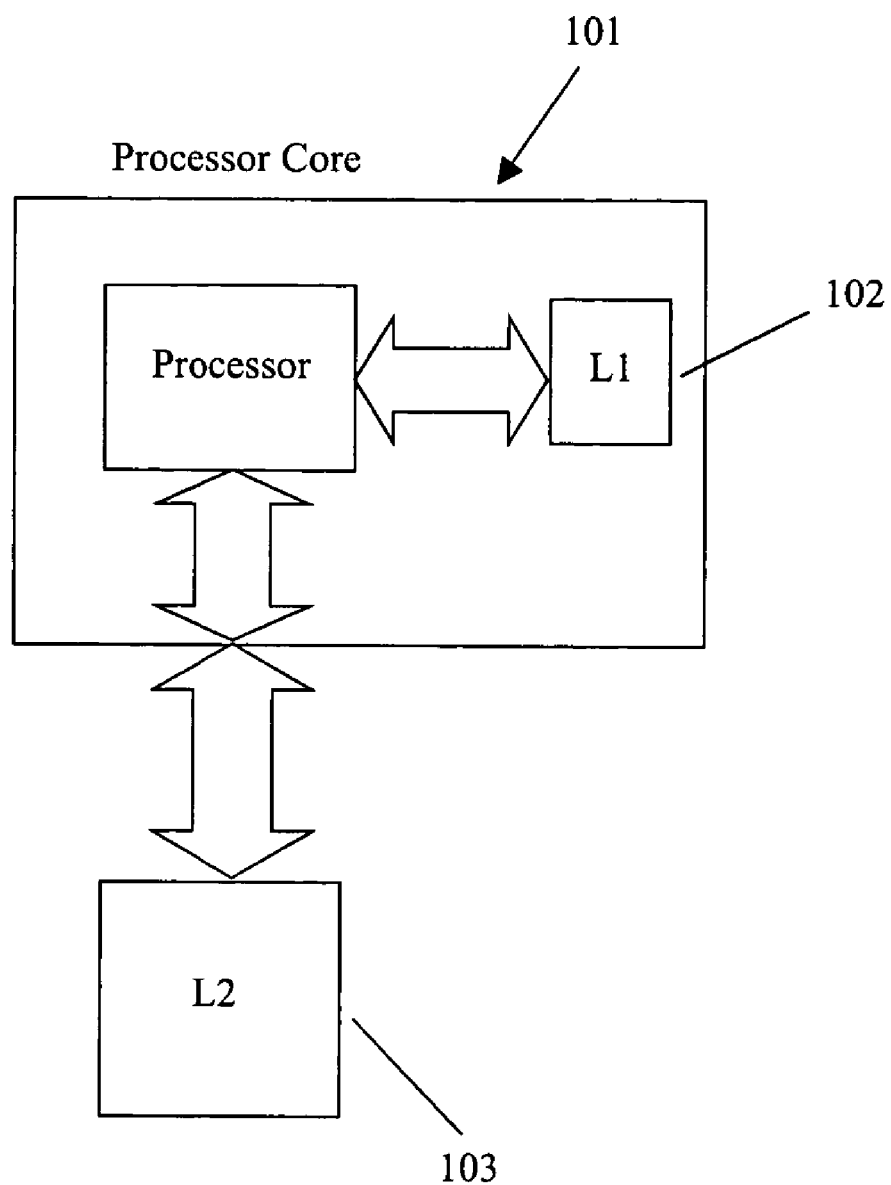
FIG. 1 is a block schematic diagram that illustrates a processor core communicating with a level one (L1) across an internal bus and a level two (L2) cache across an external bus.
Figure 2:
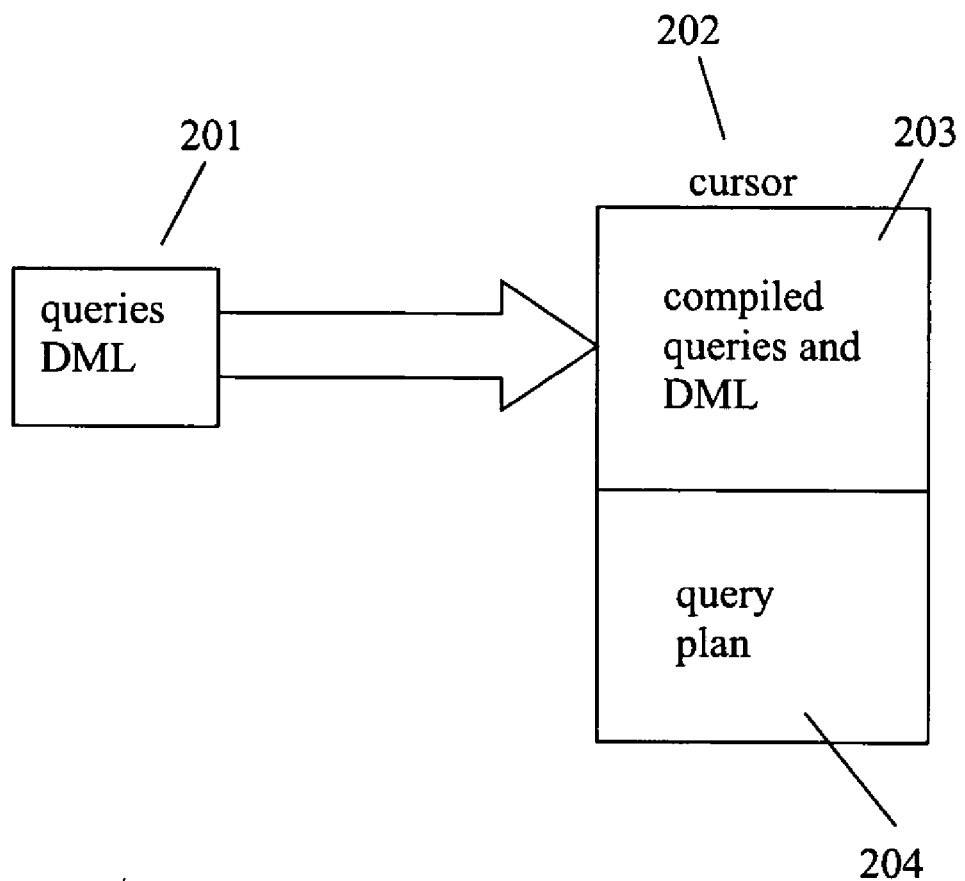
FIG. 2 is a block diagram that illustrates a cursor comprised of compiled queries and data manipulation language (DML) statements and a query plan.
Figure 3:
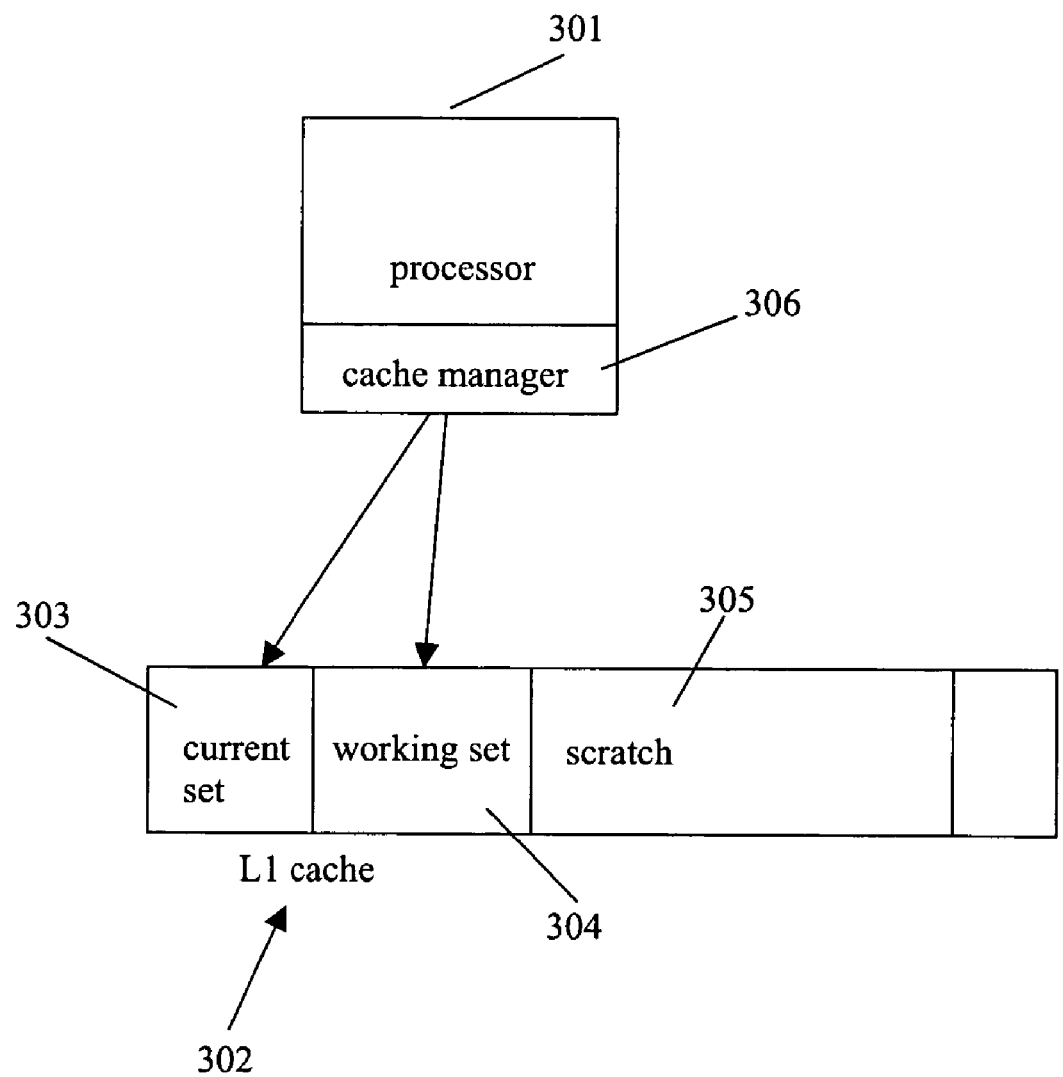
FIG. 3 is a block diagram that illustrates a processor with a cache manager allocating L1 cache memory from scratch memory space.
Figure 4:
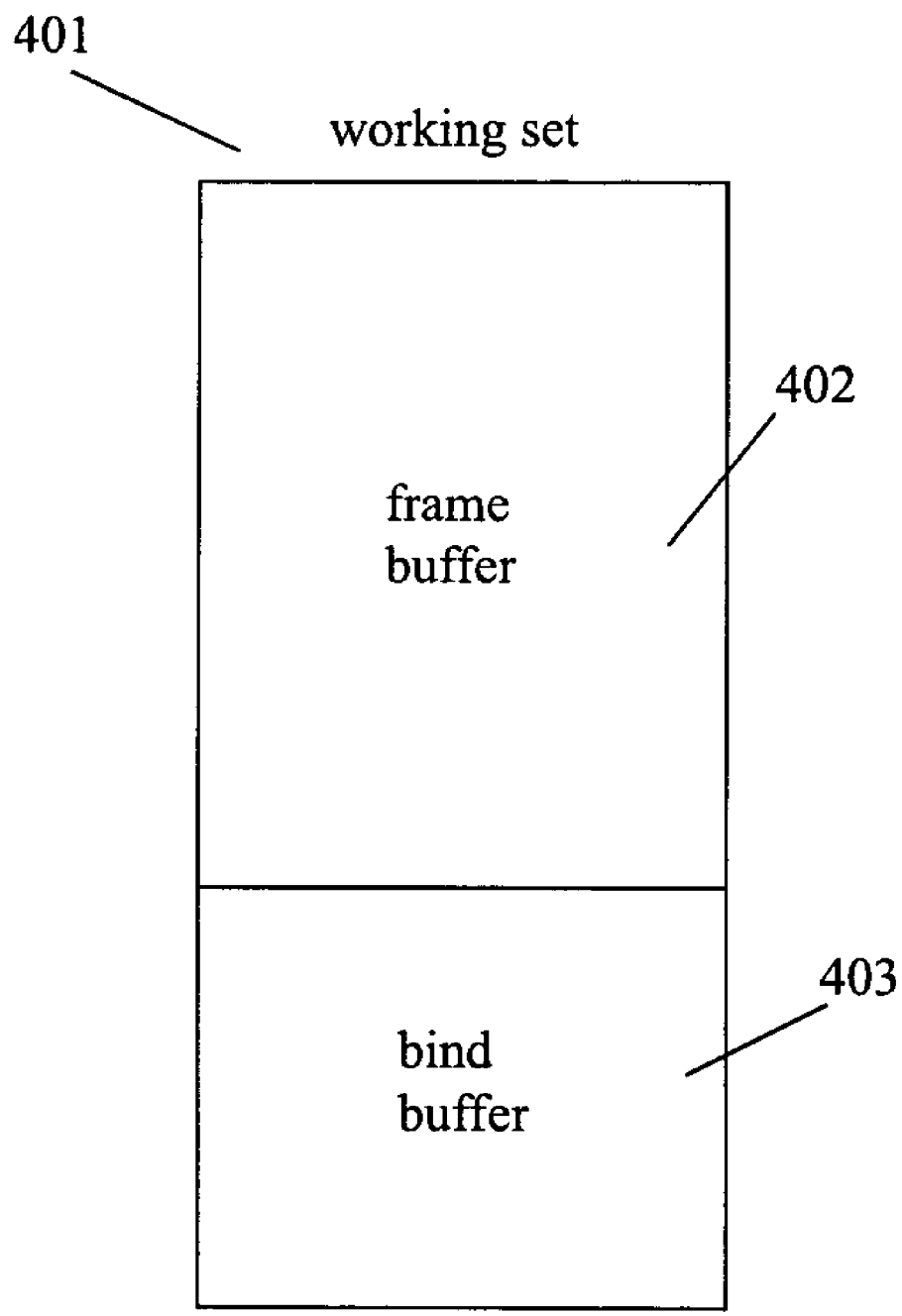
FIG. 4 is a block diagram that illustrates a working set that is contains a frame buffer and a bind buffer.
Figure 5:
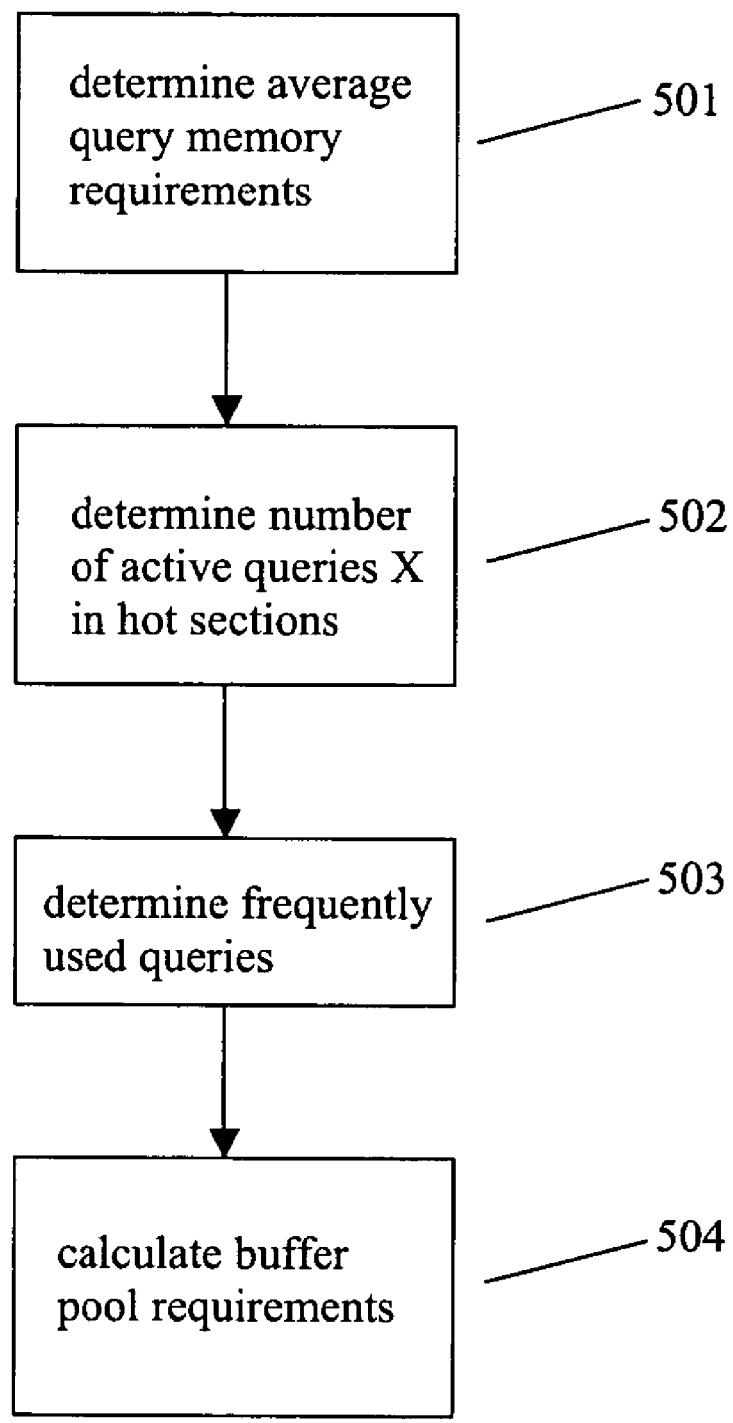
FIG. 5 is a flowchart illustrating the calculation of a buffer pool.
Figure 6:
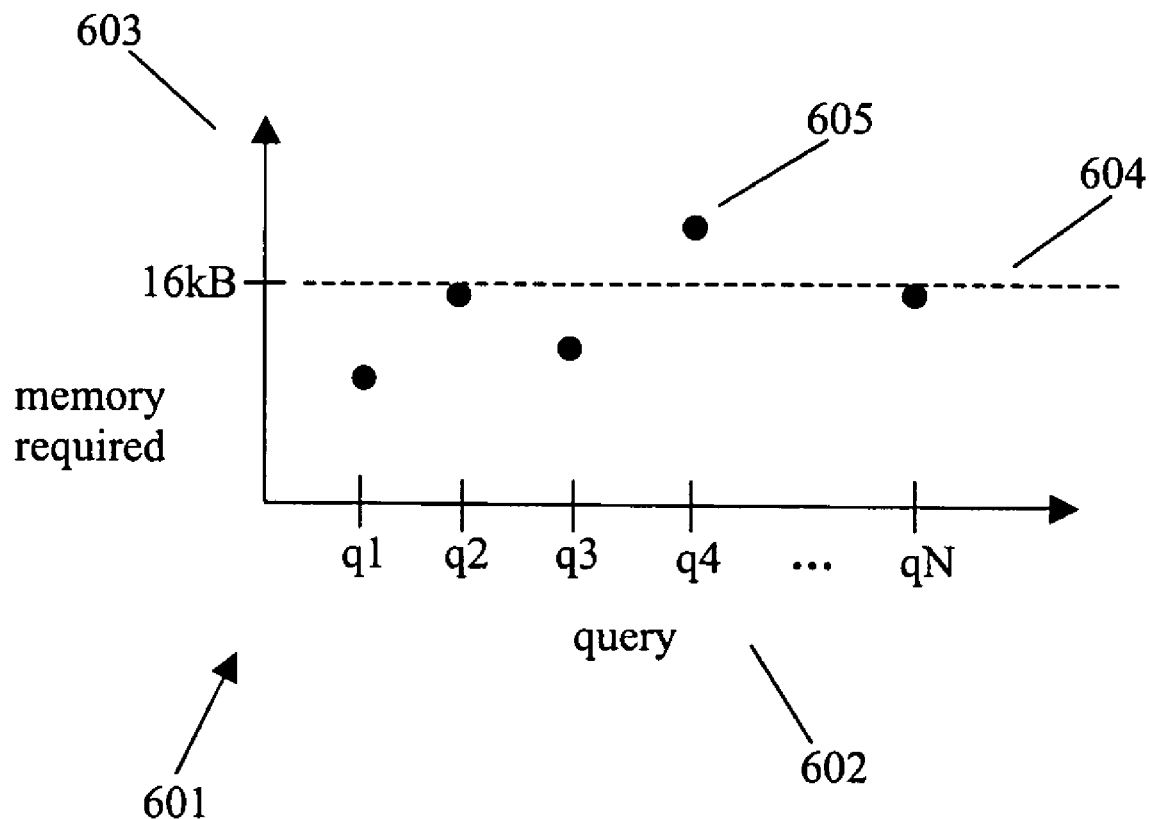
FIG. 6 is a diagram that illustrates a compile-time determination of query memory requirements.

Referring to FIG. 5, a flowchart describing how a buffer pool is created is shown. The memory requirement of the working set for an average case query is determined 501. FIG. 6 shows that the amount of memory that each query will require is determinable at compile time. The amount of memory required 603 for each query 602 is evaluated 601. Each query 602 is examined and the buffer size that will be sufficient to satisfy the average query is determined 604.

How the buffer size 604 is determined is dependent upon the desired efficiency of the L1 cache. The larger the buffer size 604, the more queries will be able to fit in the buffer pool without requiring the processor's cache manager to allocate L1 memory beyond the buffer pool. However, it is not efficient to cover all possible cases when only one or two queries, e.g., 605, require an amount of memory that exceeds the average requirement by an amount that would represent a significant waste of memory space because only that set of queries would use the extra memory space.

Database applications typically have several queries that are repeatedly used 503. The frequently used queries may have memory requirements that are beyond the buffer size, but are used so frequently that having their working sets in the buffer pool will reduce cache misses and shorten response times to the user.

Figure 7:
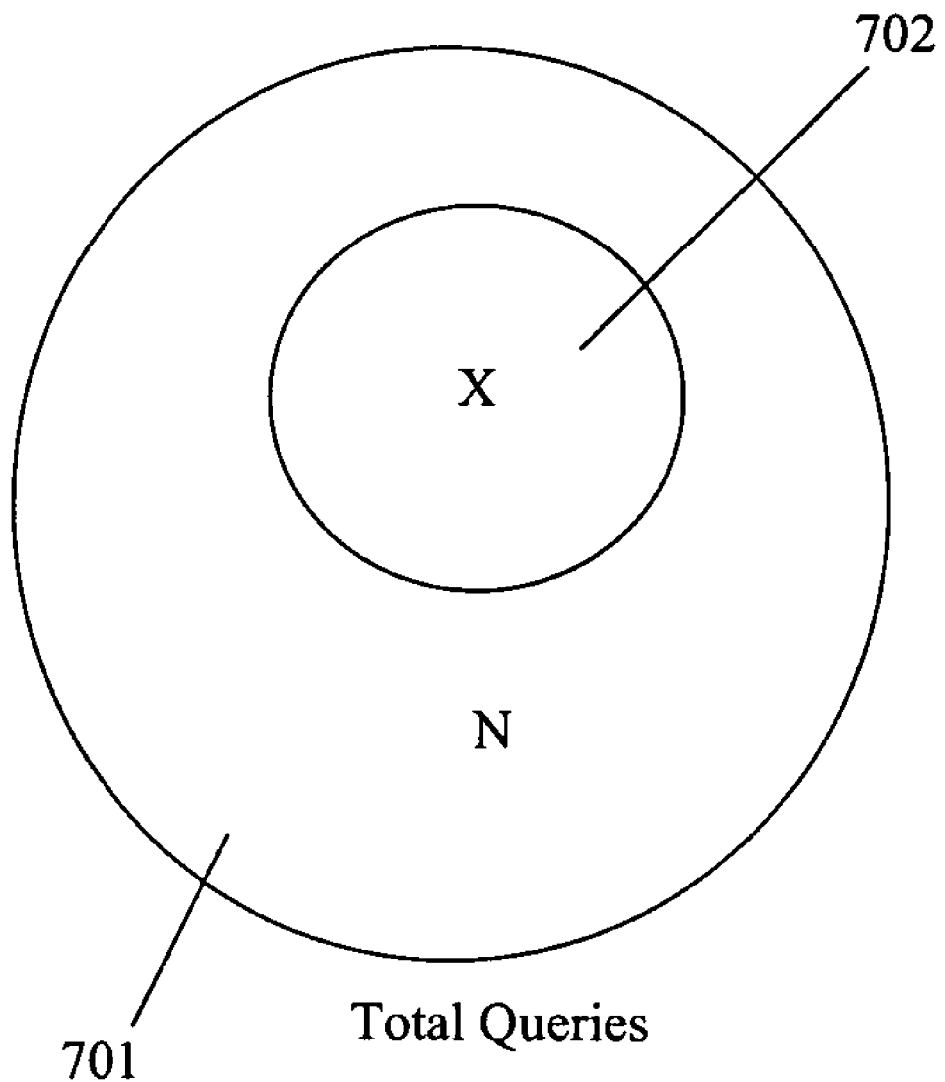
FIG. 7 is a block diagram that illustrates a working set X that is executed at a certain point in time.

The number of active queries at a certain point in time is determined 502. Typically, the working sets of all N supplied queries for an application will not fit in the L1 cache. Not all N queries are executed at once. FIG. 7 shows that a subset of queries, X 702, which is less than the total N queries 701, will be executing at a given point in time. The working sets of the X queries 702 will typically fit concurrently in the L1 cache. This set of queries is called the hot section. There may be several hot sections in the set of N queries.

According to one embodiment, the desired buffer pool size is determined by multiplying (1) the buffer size determined from the average query and (2) the number of queries executed in hot sections (e.g., the peak value). For example, if the buffer size is 16K bytes and the number of queries executed at a given time is typically six, then the buffer pool will be 6*16 KB=96 KB. On the other hand, if the frequently used set consists of several queries that require 17 KB of memory, then it would be more efficient to have a buffer pool that has buffers that are large enough to accommodate those queries. In this example, the size of the buffer pool would be 6*17 KB=102 KB.

Multiple Buffer Pools

Figure 9:
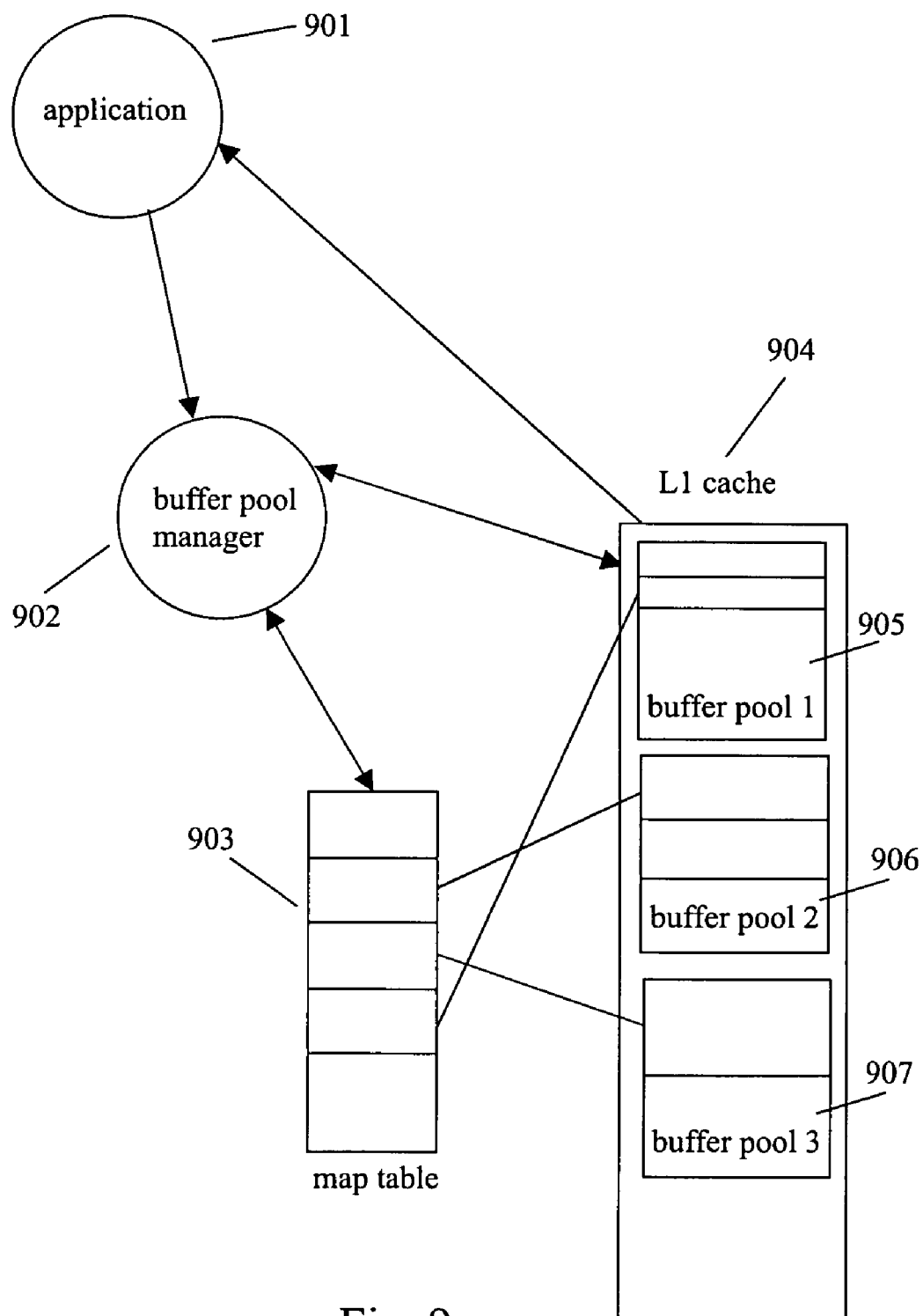
FIG. 9 is a block diagram that illustrates a buffer pool manager managing multiple buffer pools each containing different size buffers in L1 cache.

FIG. 9 illustrates an alternative embodiment where different buffer pools 905, 906, 907 are created in the L1 cache 904, where each of the buffer pools has a characteristic that differs from the other buffer pools. For example, each of the buffer pools may manage buffers of different sizes, to more efficiently adapt to the memory requirements of a working set. When an application process 901 issues a database command that results in an L1 memory request, the buffer pool manager 902 allocates memory from the L1 cache 904 in one of the different buffer pools 905, 906, 907. The buffer pool selected by the buffer pool manager 902 may hinge, for example on the size of the memory requirements of the database command, and the size of the buffers within each of the pools.

The size of the buffer pools can be determined using the memory requirements of queries obtained at compile time, as described in FIGS. 5 and 6, above. Specifically, the memory requirements of the queries can be grouped into two or more groups (depending on the number of buffer pools desired), where the maximum memory requirement is different for each group.

Once the memory requirements have been divided into groups, the size of the buffer pools may be determined by finding the hot sections of each group and determining the number of queries being executed at one time for each group. Ideally, the buffer pool size should accommodate the maximum size of each hot section. Given the analysis all of the queries executed during each hot section, the buffer pools can be utilized more efficiently by taking into account that some queries may be allocated memory from another buffer pool that has buffers that are larger than needed and that are unused during a particular hot section.

Once the buffer pool sizes have been determined, the map table 903 is mapped to the buffers in each buffer pool 905, 906, 907. In this example, there are three buffer pools, however, there can be two to n buffer pools, depending on the L1 cache size and how narrowly the buffer pools are tailored to the working sets.

The buffer pool manager 902 selects a buffer from the buffer pools 905, 906, 907 that will accommodate the application process' memory request. The buffer pool manager 902 attempts to find a buffer that is closest to size to the memory request. If the buffer pool that contains the closest size buffer has no buffers free, then the buffer pool manager 902 allocates a larger size buffer to the application process 901. The map table 903 is marked as in use for that buffer location and the buffer is allocated to the application process 901.

Buffers in the buffer pools 905, 906, 907 are freed as described above. When the application process frees its memory, the map table 903 location that corresponds to the freed buffer is marked as free. The buffer is again available for allocation.

Hardware Overview

Figure 10:
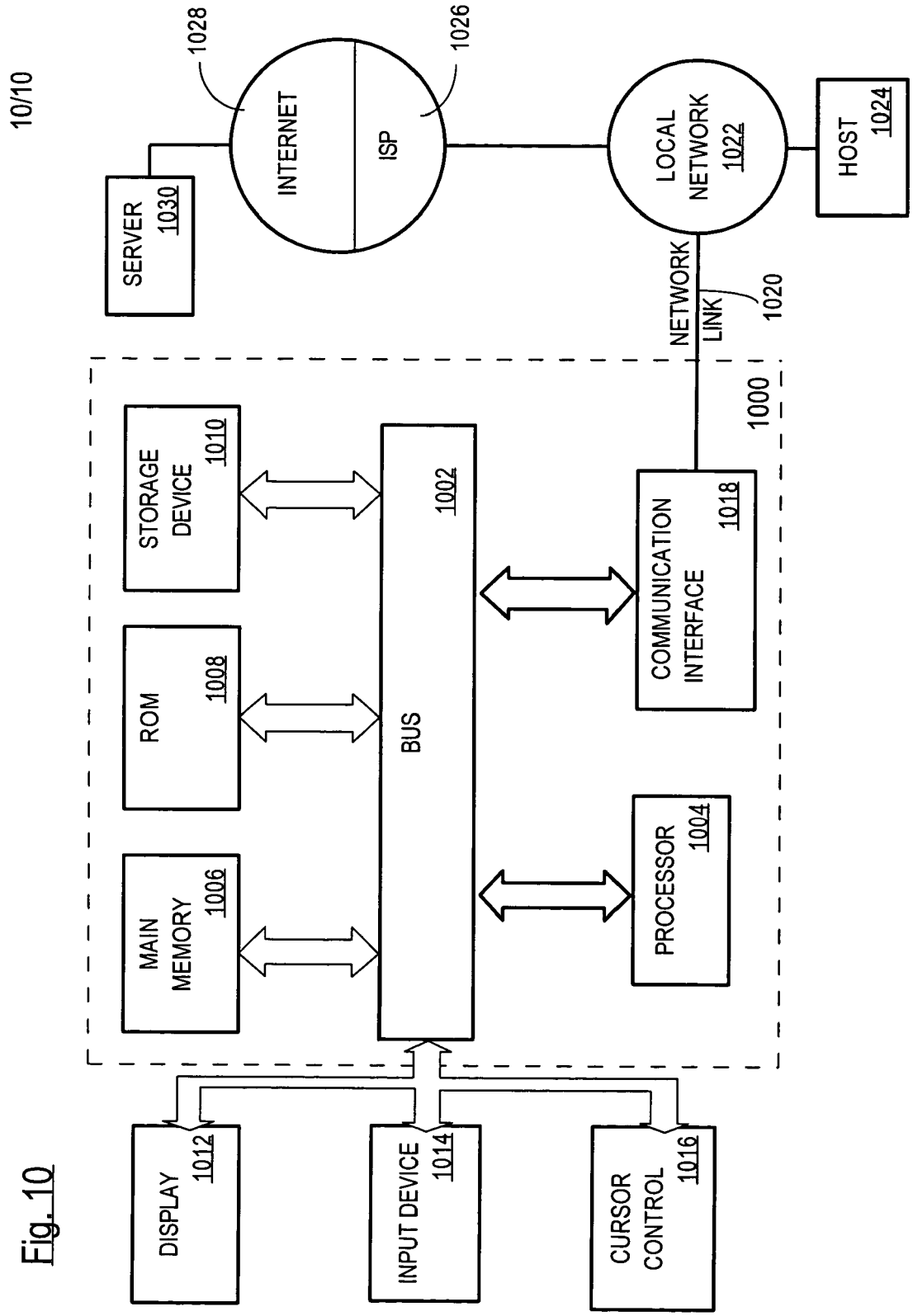
FIG. 10 is a block diagram that illustrates a computer system upon which an embodiment may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing memory used for query execution, the method comprising the computer-implemented steps of:
    allocating a buffer map table with locations that correspond to a buffer pool in a cache memory;
    wherein the cache memory is managed by a cache memory manager;
    wherein the buffer map table is managed by a buffer pool manager that is distinct from said cache memory manager;
    wherein the buffer pool includes a plurality of buffers;
    in response to a need to cache a query working set of a query in the cache memory, the buffer pool manager allocating to the query working set a buffer from the buffer map table that corresponds to a buffer in the buffer pool,
    prior to generating said buffer map table,
        calculating working set memory requirements of an average query;
        generating an estimate of how many queries will be executing at a given time;
        determining how many buffers within the buffer pool are required to accommodate the average query based on the estimate of how many queries will be executing at a given time;
    generating the buffer map table based on the working set requirements of the average query and the estimate of how many queries will be executing at a given time.

2. The method of claim 1 wherein the step of allocating a buffer includes allocating a buffer to store a frame buffer and a bind buffer associated with said query.

3. A method as recited in claim 1, wherein the step of calculating total number of buffers to include in the buffer pool further comprises the steps of:
    calculating working set memory requirements of queries executing during hot sections;
    calculating working set memory requirements of frequently used queries;

sizing buffers in the buffer pool to accommodate the working set memory requirements of the queries executing during hot sections and the working set memory requirements of the frequently used queries; and setting the total number of buffers in the buffer pool to a number sufficient to accommodate queries executed during a hot section.

4. A method as recited in claim 1, wherein the buffer pool manager does not allocate a buffer from the buffer map table to a query working set if the working set is larger than the size of buffers within said buffer pool.

5. A method as recited in claim 1,
wherein locations in the buffer map table correspond to free and used buffers in the buffer pool; and
wherein the buffer pool manager refers to the buffer map table to find free buffers in the buffer pool prior to allocating buffers in the buffer pool.

6. A method as recited in claim 5, wherein the buffer pool manager allocates a buffer from the buffer pool to a query working set if the buffer map table has a free buffer.

7. A method as recited in claim 5, wherein the buffer pool manager does not allocate a buffer from the buffer pool to a query working set if the buffer map table shows that no buffers are free in the buffer pool.

8. A method as recited in claim 5, wherein the buffer pool manager frees a buffer in the buffer pool, without removing the buffer from the buffer pool, after a query releases its allocated buffer by marking a location in the buffer map table that corresponds to the released buffer as free.

9. The method of claim 1 wherein said buffer pool is a first buffer pool, and the method further comprises the steps of:
allocating in the buffer map table a plurality of locations that correspond to a plurality of buffer pools in the cache memory;
wherein the plurality of buffer pools include the first buffer pooi and at least one other buffer pool;
wherein each buffer pool of plurality of buffer pools is comprised of a plurality of buffers;
wherein each buffer pool of the plurality of buffer pools has a characteristic that differs from each other buffer pool of the plurality of buffer pools; and
the buffer pool manager determines which buffer pool of the plurality of buffer pools should be used to store the query working set based on the characteristics of the buffer pools.

10. The method of claim 9 wherein buffers in each buffer pool of the plurality of buffer pools have a different size than buffers in the other buffer pools in the plurality of buffer pools.

11. A method as recited in claim 9, further comprising, prior to allocating the plurality of buffer pulls, calculating total number of buffers to include in each buffer pool.

12. A method as recited in claim 11, wherein the step of calculating a total number of buffers to include in each buffer pool further comprises the steps of:
calculating working set memory requirements of queries executing during hot sections;
grouping the queries in the hot sections into at least two groups based on common working set memory requirements;
sizing buffers in a particular buffer pool to accommodate the working set memory requirements of queries in one group; and
setting the number of buffers in the particular buffer pool to a number sufficient to accommodate the number of queries executed during a hot section in the one group.

13. A method as recited in claim 12, wherein the total number of buffers in a buffer pool is set so that some queries may be allocated memory from another buffer pool that has buffers that are larger than needed and are unused during a particular hot section.

14. A method as recited in claim 9, wherein the buffer pool manager does not allocate a buffer from a buffer pool to a query working set if the query working set is larger than the largest buffer's size.

15. A method as recited in claim 9,
wherein locations in the buffer map table correspond to free and used buffers in the buffer pool; and
wherein the buffer pool manager refers to the buffer map table to find free buffers in the buffer pool prior to allocating buffers in the buffer pool.

16. A method as recited in claim 15, wherein the buffer pool manager allocates a buffer from the buffer pool to a query working set if the buffer map table has a free buffer.

17. A method as recited in claim 15, wherein the buffer pool manager does not allocate a buffer from the buffer pool to a query working set if the buffer map table shows that no buffers are free in the buffer pool.

18. A method as recited in claim 15, wherein the buffer pool manager frees a buffer in the buffer pool after a query releases its allocated buffer by marking a location in the buffer map table that corresponds to the released buffer as free.

19. A computer-readable storage medium carrying one or more sequences of instructions which, when executed by one or more processors, causes the one or more processors to perform the method recited in claim 1.

20. A computer-readable storage medium carrying one or more sequences of instructions which, when executed by one or more processors, causes the one or more processors to perform the method recited in claim 2.

21. A computer-readable storage medium carrying one or more sequences of instructions which, when executed by one or more processors, causes the one or more processors to perform the method recited in claim 3.

22. A computer-readable storage medium carrying one or more sequences of instructions which, when executed by one or more processors, causes the one or more processors to perform the method recited in claim 4.

23. A computer-readable storage medium carrying one or more sequences of instructions which, when executed by one or more processors, causes the one or more processors to perform the method recited in claim 5.

24. A computer-readable storage medium carrying one or more sequences of instructions which, when executed by one or more processors, causes the one or more processors to perform the method recited in claim 6.

25. A computer-readable storage medium carrying one or more sequences of instructions which, when executed by one or more processors, causes the one or more processors to perform the method recited in claim 7.

26. A computer-readable storage medium carrying one or more sequences of instructions which, when executed by one or more processors, causes the one or more processors to perform the method recited in claim 8.

27. A computer-readable storage medium carrying one or more sequences of instructions which, when executed by one or more processors, causes the one or more processors to perform the method recited in claim 9.

28. A computer-readable storage medium carrying one or more sequences of instructions which, when executed by one or more processors, causes the one or more processors to perform the method recited in claim 10.

29. A computer-readable storage medium carrying one or more sequences of instructions which, when executed by one or more processors, causes the one or more processors to perform the method recited in claim 11.

30. A computer-readable storage medium carrying one or more sequences of instructions which, when executed by one or more processors, causes the one or more processors to perform the method recited in claim 12.

31. A computer-readable storage medium carrying one or more sequences of instructions which, when executed by one or more processors, causes the one or more processors to perform the method recited in claim 13.

32. A computer-readable storage medium carrying one or more sequences of instructions which, when executed by one or more processors, causes the one or more processors to perform the method recited in claim 14.

33. A computer-readable storage medium carrying one or more sequences of instructions which, when executed by one or more processors, causes the one or more processors to perform the method recited in claim 15.

34. A computer-readable storage medium carrying one or more sequences of instructions which, when executed by one or more processors, causes the one or more processors to perform the method recited in claim 16.

35. A computer-readable storage medium carrying one or more sequences of instructions which, when executed by one or more processors, causes the one or more processors to perform the method recited in claim 17.

36. A computer-readable storage medium carrying one or more sequences of instructions which, when executed by one or more processors, causes the one or more processors to perform the method recited in claim 18.

* * * * *

UNITED STATES PATENT AND TRADEMARK OFFICE
CERTIFICATE OF CORRECTION

| | |
|---|---|
| PATENT NO. | : 7,120,776 B2 |
| APPLICATION NO. | : 10/771573 |
| DATED | : October 10, 2006 |
| INVENTOR(S) | : Kumar Rajamani et al. |

It is certified that error appears in the above-identified patent and that said Letters Patent is hereby corrected as shown below:

COLUMN 9

Claim 9: Line 37, delete "pooi" and insert --pool--.

Line 38: Delete "of plurality" and insert --of the plurality--.

Signed and Sealed this

Twenty-third Day of January, 2007

JON W. DUDAS
*Director of the United States Patent and Trademark Office*